United States Patent
Jacobs (12)

(10) Patent No.: US 6,463,306 B1
(45) Date of Patent: *Oct. 8, 2002

(54) TRANSMISSION SYSTEM COMPRISING AT LEAST A SATELLITE STATION WHICH INCLUDES CIRCUITS FED BY AN ENERGY SOURCE AND SATELLITE SUITABLE FOR SUCH A SYSTEM

(75) Inventor: Jan Jacobs, Fillé sur Sarthe (FR)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/033,742

(22) Filed: Mar. 3, 1998

(30) Foreign Application Priority Data

Mar. 4, 1997 (FR) .............................. 97 02556

(51) Int. Cl.$^7$ ............................................ H04B 1/38
(52) U.S. Cl. .................. 455/574; 455/343; 370/311
(58) Field of Search ................... 455/574, 343, 455/38.3, 12.1, 13.4, 311, 76, 258, 260; 375/224; 370/311

(56) References Cited

U.S. PATENT DOCUMENTS

| 4,521,918 | A | * | 6/1985 | Challen ..................... 455/343 |
| 4,631,496 | A | * | 12/1986 | Borras et al. ............... 331/1 A |
| 4,673,892 | A | * | 6/1987 | Miyashita et al. ............ 331/14 |
| 5,369,798 | A | * | 11/1994 | Lee ............................. 455/434 |
| 5,406,613 | A | * | 4/1995 | Peponides et al. .......... 455/574 |
| 5,568,513 | A | | 10/1996 | Croft et al. .................. 375/224 |
| 5,606,739 | A | * | 2/1997 | Goto ........................... 455/343 |
| 5,649,315 | A | * | 7/1997 | Eaton ........................... 455/343 |
| 5,701,329 | A | * | 12/1997 | Croft et al. .................. 375/224 |
| 5,715,278 | A | * | 2/1998 | Croft et al. .................. 375/224 |
| 5,805,989 | A | * | 9/1998 | Ushida ........................ 455/343 |
| 5,878,336 | A | * | 3/1999 | Cashen et al. .............. 455/343 |
| 5,905,965 | A | * | 5/1999 | Asano et al. ................ 455/574 |

FOREIGN PATENT DOCUMENTS

| EP | 0051774 B1 | 5/1982 |
| EP | 0051774 A1 | 5/1982 |

OTHER PUBLICATIONS

"Nicket Metal–Hydride Emulation for Lithium Ion Battery Pack", IBM Tecnical Disclosure Bulletin, vol. 38, No. 7, Jul. 1995.

* cited by examiner

Primary Examiner—Edward F. Urban
Assistant Examiner—Erika A. Gary
(74) Attorney, Agent, or Firm—Steven R. Biren

(57) ABSTRACT

This transmission system includes at least one transmitter station (8) for transmitting data blocks and at least a satellite station (1) receiving the blocks. The satellite station cuts off the power supply of certain of its circuits when a block does not relate to the satellite station.

5 Claims, 2 Drawing Sheets

TRANSMISSION SYSTEM COMPRISING AT LEAST A SATELLITE STATION WHICH INCLUDES CIRCUITS FED BY AN ENERGY SOURCE AND SATELLITE SUITABLE FOR SUCH A SYSTEM

BACKGROUND OF THE INVENTION

The present invention relates to a transmission system comprising at least a transmitter station for transmitting data blocks and at least a satellite station receiving said blocks, the satellite station including circuits whose power is supplied by at least one energy source.

The invention also relates to a satellite station suitable for such a system.

The invention finds interesting applications notably in the field of cellular mobile radio systems of the GSM, ETACS, AMPS and other types.

When a person is a user of such a system, he or she is subjected to the problem of the autonomy of the personal mobile satellite stations which problem is linked with their electric power consumption. Moreover, these stations are to be not very cumbersome and as light as possible. It is thus interesting to limit the electric power consumption of these personal stations, so that the accumulator can be as small and light as possible for a suitable autonomy.

One of the circuits that consumes much energy is the input phase-locked loop local oscillator. For saving on energy, it is known from patent specification EP 0 051 774 to stop the phase-locked loop oscillator and retain its control voltage for the plates of a capacitor. In this manner, it is possible to stop this oscillator on many occasions.

SUMMARY OF THE INVENTION

The present invention proposes a system of the type defined in the opening paragraph in which the saving of energy is improved.

Therefore, such a system is characterized in that at least one of said circuits has a means for cutting off its supply voltage used for at least one block.

The idea of the invention comprises profiting from the system in which the data are conveyed in blocks which notably have a certain redundancy. It thus happens that only several blocks relate to mobile stations. It is then possible to stop several circuits of the mobile station during the blocks which do not relate to them and to save electric energy in this way.

According to an interesting characteristic feature of the invention, an integrated circuit which includes various components and comprises a control for cutting off the power supply of certain elements is provided in the mobile stations.

Thus, according to this characteristic feature, only the elements that have no function in an integrated circuit when the mobile station is in the standby mode have their power supply cut off.

These and other aspects of the invention will be apparent from and elucidated with reference to the embodiments described hereinafter.

DESCRIPTION OF THE PREFERRED EMBODIMENTS

Figure 1:
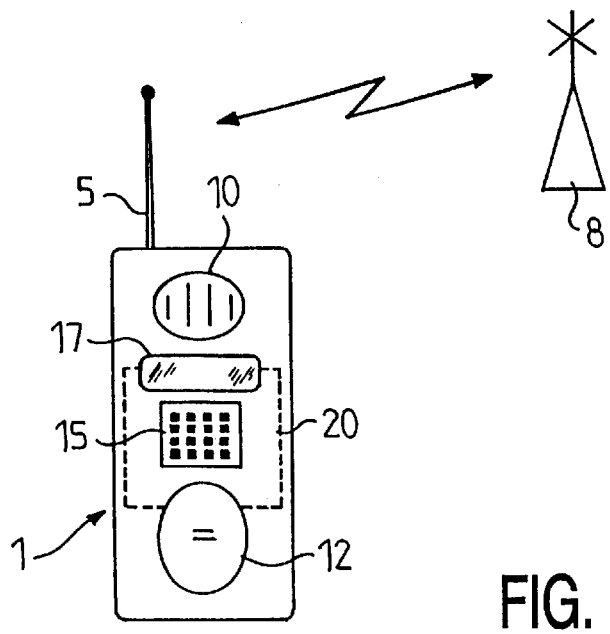
FIG. 1 shows a system according to the invention.

In FIG. 1, reference 1 indicates a mobile station according to the invention. This station has an antenna 5 which makes it possible for the station to receive and transmit waves to a base station 8 of a radio network of the cellular telephony type GSM, ETACS, AMPS and others. The mobile station 1 comprises an earphone 10, a microphone 12, a keyboard 15 and a display 17. The dotted lines represent an electronic part 20 situated inside the station.

Figure 2:
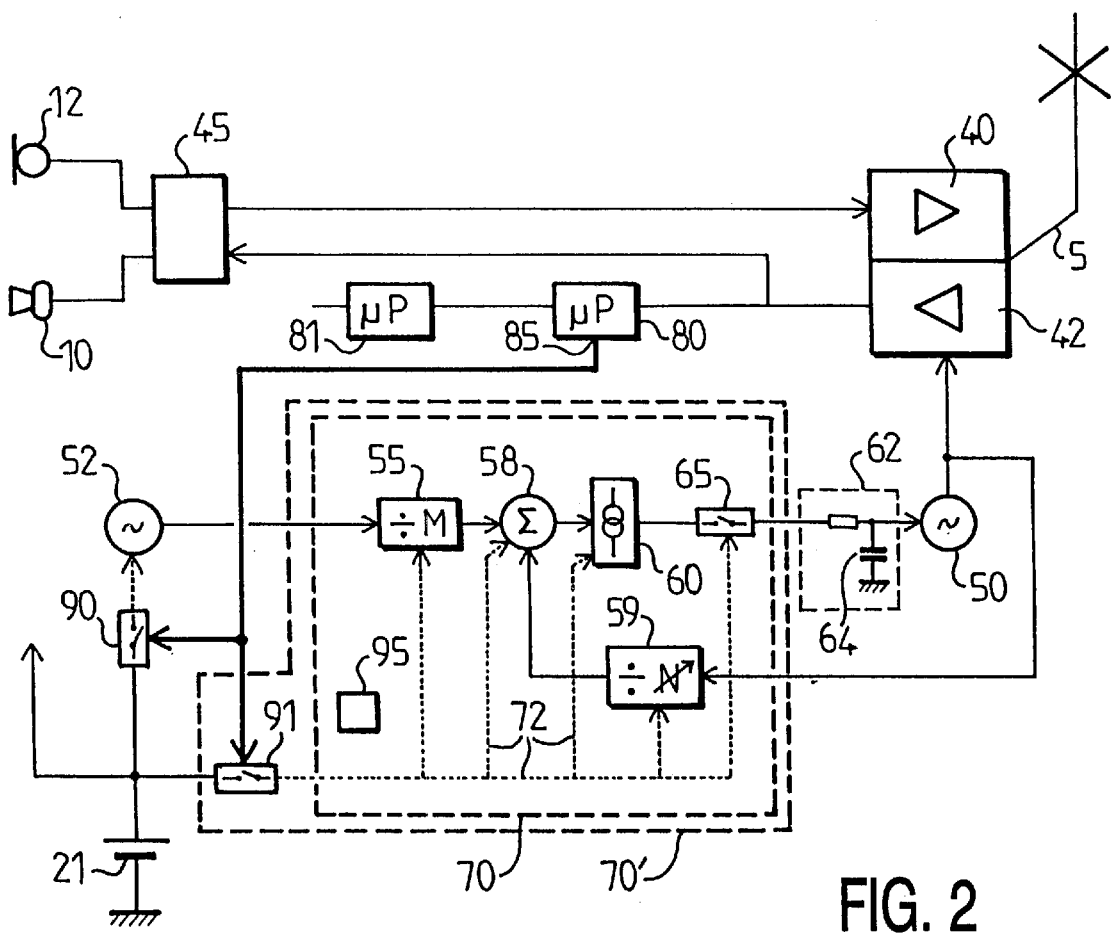
FIG. 2 shows a mobile station according to the invention.

This part 20 fed by an accumulator 21 is shown in more detail in FIG. 2. It comprises a transmitter assembly 40 and a receiver assembly 42 for transmitting and for receiving various data which are common in cellular telephony technology. These transmitter and receiver parts are connected to a microphone 12 and to an earphone 10 via a processing element 45. The receiver part makes a local oscillator 50 necessary which is inserted into a phase-locked loop.

This loop is formed by an oscillator referenced 52 followed by a fixed frequency divider 55, a phase comparator 58 for comparing the phases of the signals produced by the divider 55 with phases of the signals originating from a variable divider 59 whose divider rate finally fixes the frequency of this local oscillator 50. The comparator 58 controls a pump circuit 60 which applies currents to a filter circuit 62 represented in the figure by an RC cell notably comprising a capacitor 64. The pump circuit is a three-state circuit which is to say that its output impedance may have an infinite value. This is shown in the diagram of FIG. 2 by a switch 65. In this manner, the voltage on the plates of the capacitor 64 is maintained for a certain period of time when the switch 65 is open. The various component parts which have just been described, that is to say, the elements 55, 58, 59, 60 and 65 may be located in an integrated circuit 70. Reference 72 shows the power supply lines of these aforesaid elements.

Various microprocessors 80 and 81 perform the various processes with the data produced by the receiver assembly 42. The microprocessor 80 produces on a line 85 the result of a "vote" carried out with data blocks sent by the base station 8. The other microprocessor 81 is charged with the management of the operation of the mobile station 1.

The invention is additionally used in the standby mode. In this mode, the mobile station is standby for a call and thus captures a signal frame such as those shown in FIG. 3A. This signal frame relates to the signals of the TACS, E-TACS standard.

According to this standard, the signals begin with a sequence or block BS which is intended for the synchronization at bit level, and a sequence WS which is a synchronization sequence at frame level. These synchronization preambles are succeeded by a 5-time repetition of the words corresponding to the number of the called party. This number is transmitted five times in the frame in interleaved manner. This is to say that certain mobile stations hear the words WA1 to WA5, whereas others hear the words WB1 to WB5. For determining the called number, a "vote" is made with this repetition of five words. If a word is repeated three times in the frame in the same way, it is declared that this is the word that is to be considered. Thus, if the first three blocks are identical, the invention thus proposes to cut off the power supply of various components very soon. But, if the first, the second and the fourth block are identical, the power supply will be cut off after this fourth block.

The invention proposes, according to one of the characteristic features, to cut off the power supply of the phase-locked loop the moment a word has been determined. The switch 65 is put in open position so that the voltage to the plates of the capacitor 64 is maintained when the power supply is cut off. Thus, the phase locking during the next appearance of the supply voltage will be facilitated.

The cutting-off of the elements is shown in FIG. 2 by switches 90 and 91 which permit for the first switch to cut off the power supply of the oscillator referenced 52 and for the second switch to cut off the power supply of the integrated circuit 70.

Figure 3:
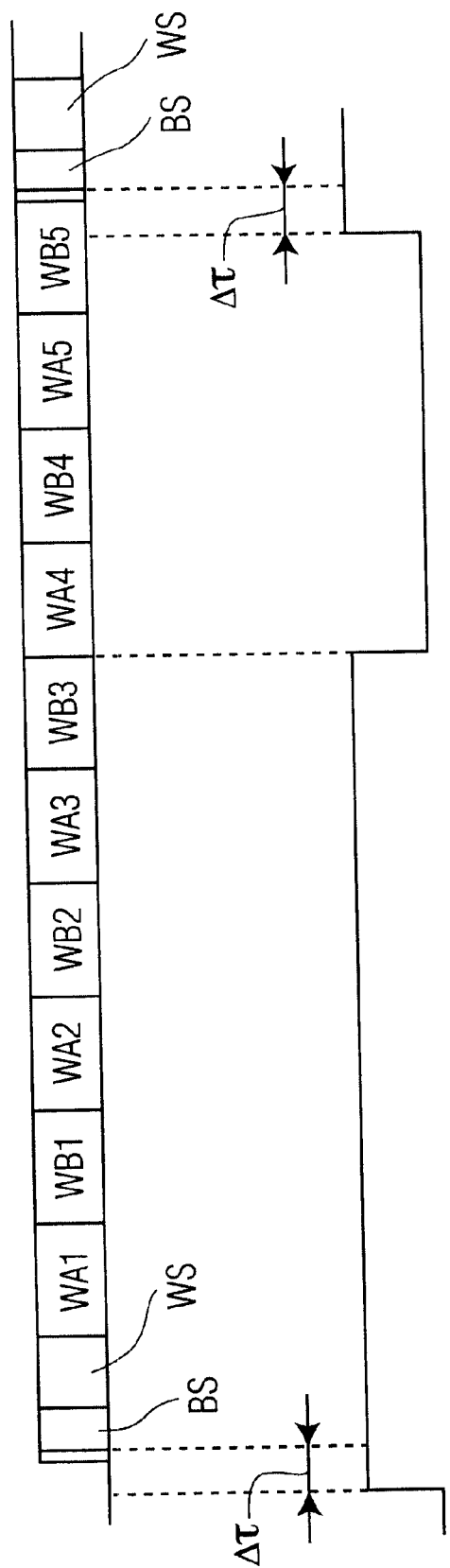
FIG. 3 shows a timing diagram explaining the operation periods of the local oscillator, telephony device according to the invention.

FIG. 3 shows the signal which influences the various switches. In FIG. 3 is referenced Δτ a standby time for recreating the power supply to the elements so that the processing may take place from the moment it becomes necessary, without data being lost.

In FIG. 2 is shown in dotted lines another configuration for another integrated circuit 70', that is to say, that in the circuit a power cutting means is provided for certain of the components which are integrated therein, as power must be continued to be supplied to the circuit assembly 95.

Although a procedure has been described implying a vote, the invention applies to all the cases where the blocks have no importance whatsoever for the station that captures them. There too, the power supply may be coupled.

What is claimed is:

1. A transmission system comprising at least a transmitter station for transmitting data blocks and at least a satellite station for receiving said blocks organized in frames, the satellite station comprising circuits including a synthesizer which is activated at a non-predetermined starting time whose power is supplied by at least one energy source, characterized in that at least one of said circuits used for receiving at least one block includes an oscillator and a phase-locked loop and comprises means for cutting off the supply voltage to at least said oscillator and said phase-locked loop at a non-predetermined time when said block does not relate to said satellite station and as soon as said block is determined, means for providing a standby time interval delta-tau during which the cut-off supply voltage is restored, prior to receiving a subsequent block to be analyzed, and means for providing the supply voltage at about said starting time of the synthesizer.

2. The system as claimed in claim 1, in which certain repetition blocks are transmitted a number of times, characterized in that at least one satellite station comprises detection means for detecting said blocks for influencing said cutting means after at least one of said repetition blocks has been detected.

3. The system as claimed in claim 2, in which the repetition blocks are organized in frames, characterized in that the detection means influence said power cutting means when a majority of identical repetition blocks is detected in a frame.

4. A system as claimed in claim 1, characterized in that one of the circuits is an oscillator having an input for receiving a command to phase-lock and in that a storage element is provided for storing the magnitude of the command when the power cutting means is activated.

5. A mobile station suitable for a system as claimed in claim 1, characterized in that it comprises an integrated circuit containing various constituent parts and which includes a command for cutting off the power supply of certain constituent parts.

\* \* \* \* \*